Aug. 1, 1961  V. J. AZBE  2,994,521
TERMINAL CALCINING KILN
Filed Aug. 17, 1959  3 Sheets-Sheet 3

United States Patent Office 2,994,521
Patented Aug. 1, 1961

2,994,521
TERMINAL CALCINING KILN
Victor J. Azbe, Webster Groves, Mo., assignor to Azbe Corporation, Clayton, Mo., a corporation of Missouri
Filed Aug. 17, 1959, Ser. No. 834,191
4 Claims. (Cl. 263—29)

This invention relates to terminal calcining kiln apparatus, and more particularly to vertical shaft kilns for terminal calcination and cooling of lime and the like emanating from rotary drum kilns. The invention is an alternative to the vertical shaft component of a combined rotary and vertical kiln such as shown in my United States Patent 2,653,809.

Among the several objects of the invention may be noted the provision of an upright cooler and terminal calciner for use in connection with a rotary calcining drum element of the type shown in said Patent 2,653,809, wherein positive and complete terminal calcination is obtained in the vertical cooler; and the provision of a cooler of the class described which will more economically produce better-burned lime than was heretofore possible from the discharge from the rotary kiln component. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

Figure 1:
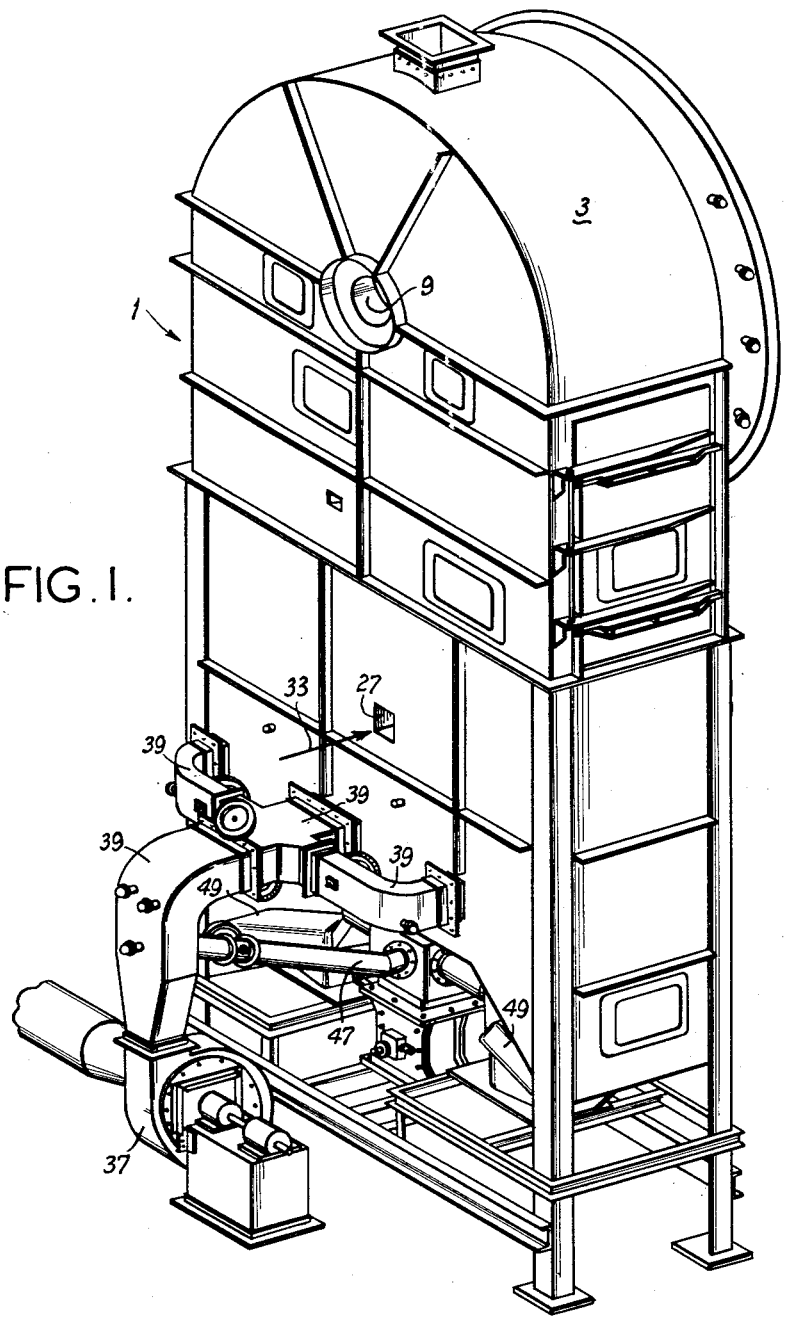
Figure 2:
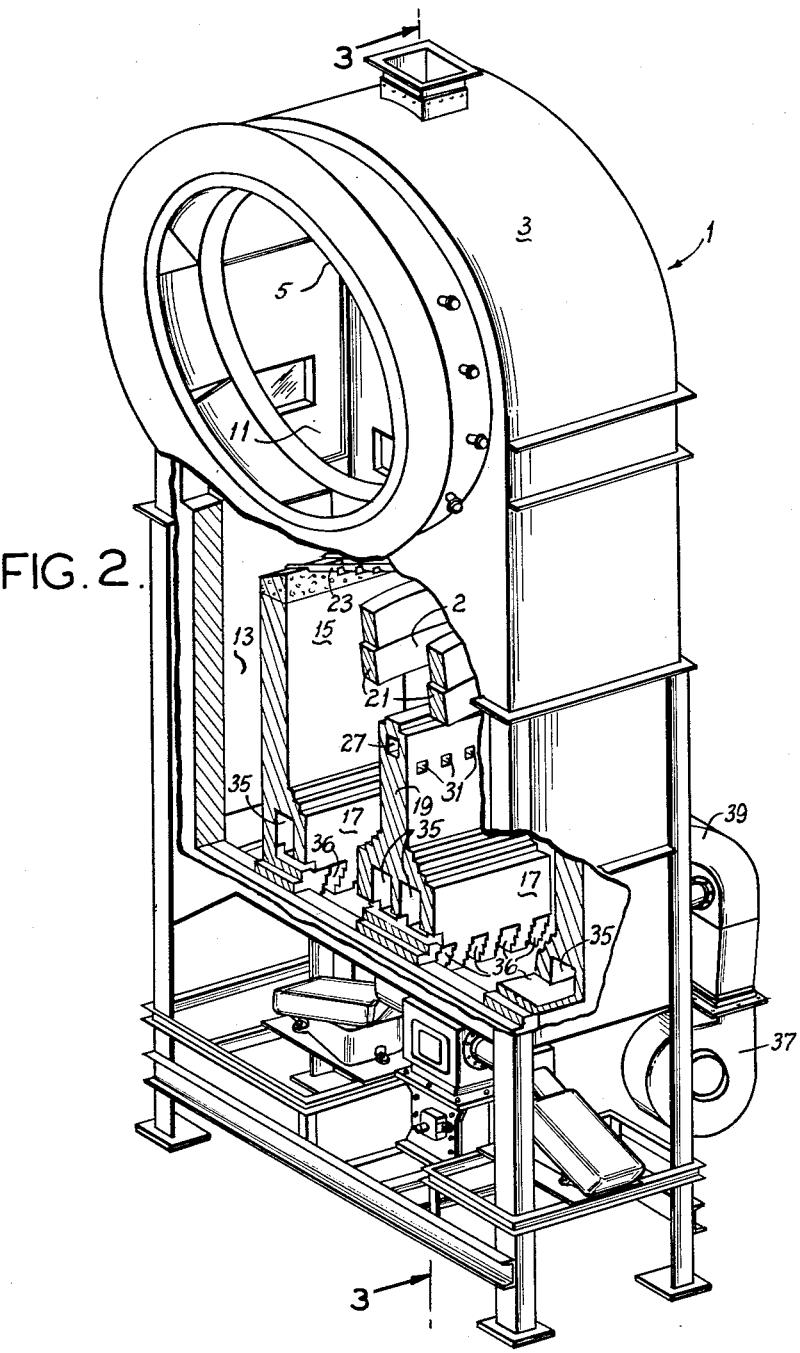
Figure 3:
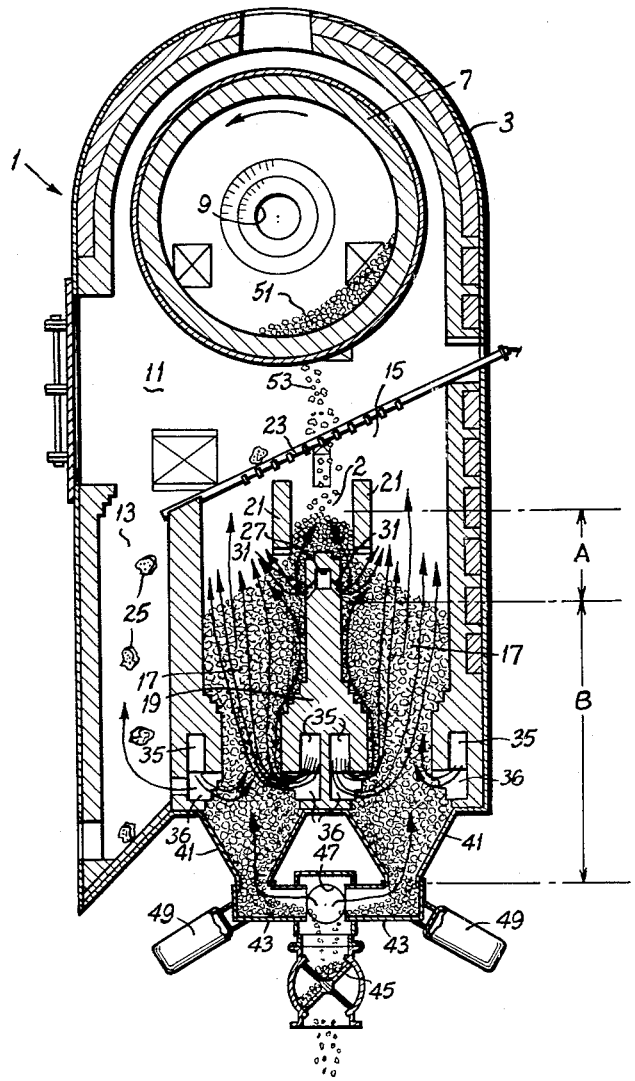

In the accompanying drawings, in which one of various possible embodiments of the invention is illustrated, FIG. 1 is an isometric view of my new cooler;

FIG. 2 is a perspective view of the other sides of said cooler, parts being broken away; and, FIG. 3 is a cross section on line 3—3 of FIG. 2.

Corresponding reference characters indicate corresponding parts throughout the several views of the drawings.

In said Patent 2,653,809, FIGS. 1 and 5 show a vertical secondary calciner or heat-soaking pit. This is formed by a shaft cooperatively arranged with the material outlet end of a rotary calcining drum in which firing of the rotary drum is accomplished through a firing hood connecting the vertical secondary calciner with the lower drum end. It sometimes occurs that lime, for example, after passing through the calcining zone in such a rotary drum, is not equally calcined throughout before entering the vertical secondary calciner. Thus in some of the pieces entering the calciner there may remain an amount of residual calcium carbonate. On the average, this may be only on the order of a percent or two, but little as it is, it may be undesirable.

In general, the secondary calciner shown in the patent accomplishes a degree of secondary calcining by heat-soaking, that is, by keeping the lime from the rotary drum hot and maintaining a heat-exchange relationship between overly hot pieces and relatively cooler pieces. Some circulation of gas through the material during heat-soaking enhances the distribution of the heat-exchange effect throughout the charge in the secondary calciner. This is in general effective, but I have found that a more positive terminal calcination can be obtained by use of a vertical cooler in which terminal calcination is accomplished, not by heat-soaking, but by the addition of fuel above its cooling portions. Thus the firing of some fuel into the upper portion of the cooling bed of a vertical cooler is a feature of the invention.

Referring now more particularly to the drawings, there is shown at numeral 1 a vertical cooler such as above referred to. This is constituted by an upper firing hood 3 having an opening 5 for the reception of the open lower end of a rotary calcining drum 7 corresponding to the sloping drum shown in said patent. At numeral 9 is shown an opening for the acceptance of a burner (not shown) adapted to fire through the hood 3 and into the drum end 7 in the usual way and as shown in said patent.

Below hood 3, the cooler herein is formed as a vertical shaft 11, one side of which forms a clinker passage 13 and the remainder of which constitutes a pit 15 which is divided into transverse cooling zone sections 17. This is effected by means of a dividing cross wall 19. The upper margin of the cross wall 19 is flanked along its length by two arched walls 21 adapted to form a pocket 2 along the upper margin of wall 19. Disposed across the upper end of the pit 15 are sloping classifying grates 23 through which calcined material falls from the drum 7 and primarily into the pocket 2, while separating out clinkers such as shown at 25 for gravitational movement into the clinker passage 13. While not all, nevertheless most of the material falling upon the sloping grates falls through their central portions and into the pocket 2 between the arched walls 21 above the upper margin of the dividing wall 19, from which this material gravitates out into the two side zones 17, as shown.

Along and within the upper margin of wall 19 is a fuel passage 27 for the reception of air and fuel such as gas, oil, powdered coal or the like. This passage 27 is connected through the transverse firing passages 31 with the upper end of the cooling zone sections 17. Suitable means (not shown) are connected at the dart 33 (FIG. 1) for introducing the fuel and air. Thus it will be seen that the upper part of the wall 19 constitutes a firing bridge below the pocket 2. In some instances the firing passage 31 may be located at a lower level in the dividing wall 19.

At the lower ends of the cooling zone sections 17 are located air passages 35 which through duct work 39 receive air from a blower 37. The passages 35 are in communication with sections 17 through connections 36. One of these passages 36 has a cross connection with the clinker passage 13. Thus air is introduced for cooling purposes into the lower ends of the cooling zone sections 17 and some into the clinker passage 13. The lower ends of the sections 17 terminate in conical outlet cooler portions 41. The lower ends of these portions 41 have cross connections 43 with a rotary air lock gate mechanism 45, which also has an air connection 47 with the duct work 39. Attached to the connections 43 are magnetic vibrators 49 for promoting gravity feed down through the portions 17, 41, 43 to the outlet gate mechanism 45.

Operation is as follows:

Combustible fuel is introduced through passage 27 and fired through passages 31. The end of the sloping drum 7 in opening 5 rotates while receiving heat from the burner (not shown) in opening 9. The substantially calcined hot contents 51 of the drum drop from its open end as shown at 53 and primarily onto the central portion of the grates 23, clinkers such as 25 being sorted out and gravitating to the left into the clinker passage 13. The more finely divided material passes the central portions of the grates 23 and for the most part drops onto the upper margin of wall 19 and between the arches 21. Then it gravitates laterally between the arches and the wall into position in the zone sections 17. After an operating charge has been built up, arches 21, with the upper margin of wall 19, form a pocket 2 and conditions are then as shown in FIG. 3, wherein the material receives a positive secondary calcination in zone A, and cooling in the cooling zone B. The positive secondary calcination in zone A is brought about by the combustion from ports 31. The calcination which occurs in zone A in a definite manner removes the residual calcium carbonate in the material emanating from the drum 7. The purpose of introducing air through ports 36 into the cooling zone B is to cool the finally calcined material. The purpose of the introduction of air from passage 47 is to assure complete terminal cooling.

An advantage of the terminal calcination in zone A after the calcination that has occurred in the drum 7 is that the calcination in zone A takes place in a vertical bed of material through which heated gases flow efficiently between pieces of the bed; whereas the material which is primarily calcined in the rotary kiln does not have the hot gases as well intermingled with it. While a large amount of calcination occurs in the rotary drum 7, some residual material is not reached by the hot gases for calcination. Thus residual uncalcined materials become positively and efficiently calcined in zone A.

It is to be understood that although the grate 23 and clinker passage 13 are desirable adjuncts of the invention, they are not indispensable.

In view of the above, it will be seen that the several objects of the invention are achieved and other advantageous results attained.

As various changes could be made in the above constructions without departing from the scope of the invention, it is intended that all matter contained in the above description or shown in the acompanying drawings shall be interpreted as illustrative and not in a limiting sense.

I claim:

1. Terminal calcining apparatus comprising an upright shaft having an upper firing hood adapted for connection with the discharge outlet of a rotary primary calcining drum, said shaft being of a length to form an upper calcining zone and a lower cooling zone, means adapted to introduce air below the cooling zone, means forming a combustible-fuel firing passage toward the top of the shaft at the upper end of the cooling zone and in firing communication therewith, pocket forming means in the shaft spaced above and adjacent to said means forming the fuel firing passage adapted to receive material from said drum and direct it into heat-exchange relationship with the fired fuel from said firing passage, whereby a fired secondary calcining zone is established in said shaft above said cooling zone, said pocket forming means being substantially spaced from a side of the shaft for upward movement of air from the cooling zone without passage through said pocket forming means, said pocket forming means having a lower margin spaced from said means forming the fuel firing passage adapted to pass material from said pocket to the calcining zone for calcination as the material moves through and from said pocket.

2. Terminal calcining apparatus comprising an upright shaft having an upper firing hood adapted for connection with the outlet end of a rotary primary calcining drum, said shaft being constructed to provide for a terminal calcining zone and a cooling zone therebelow, means adapted to introduce air below the cooling zone, a substantially vertical wall in said shaft dividing it into several cooling zone sections, said wall having in its upper portion a combustible-fuel firing passage having transverse outlets communicating interiorly with the upper ends of said sections, spaced means bridging said shaft on opposite sides and near the upper end of the wall adapted to form a pocket above and along said wall for the reception of material from said drum, said spaced bridging means and the upper margin of the wall being spaced to provide on opposite sides of said wall outlets from the pocket to said cooling zone sections respectively adjacent said firing passage outlets, whereby a secondary calcining zone is established in said shaft above the cooling zone sections.

3. Terminal calcining apparatus comprising an upright shaft having an upper firing hood adapted for connection with the outlet end of a rotary primary calcining drum, said shaft being of a length adapted to form an upper terminal calcining zone and a lower cooling zone, a substantially vertical first wall extending crosswise in said shaft and dividing it into several lower cooling sections extending from the calcining zone downward through the cooling zone, means adapted to introduce air into lower parts of said sections, said wall having toward its upper margin a combustible-fuel firing passage extending therethrough and having opposite side outlets from the wall communicating interiorly with the upper ends of said sections, means adapted to fire air and a combustible through said passage and its outlets, additional transverse substantially vertical walls having lower margins respectively spaced from opposite sides of the upper margin of the first wall and providing between them and above the first wall a pocket adapted to receive and contain material falling from said drum between said additional walls and above said first wall, each of said additional walls providing between it and an opposite wall portion in the shaft a passage for escape of cooling air from one of said cooling sections while bypassing said cooling air around said pocket, the spacing between the lower margins of said additional walls and the upper margin of the first wall being adapted to pass material from said pocket to opposite sides of the first wall and into terminal calcining heat-exchange relation to combustibles from said outlets and then down into said cooling sections.

4. Terminal calcining apparatus comprising an upright shaft having an upper firing hood adapted for connection with the outlet end of a rotary primary calcining drum, said shaft being of a length adapted to form an upper terminal calcining zone and a lower cooling zone, a substantially vertical cross wall in said shaft dividing it into two opposite cooling zone sections from the calcining zone downward through the cooling zone, means adapted to introduce air into said sections from below, said dividing wall having in its upper portion a combustible-fuel firing passage extending across the shaft and having opposite outlets respectively communicating with the upper ends of said sections, transverse arch walls having lower margins spaced oppositely from the upper margin of the dividing wall and providing between them and above the dividing wall a pocket adapted to receive, contain and calcine material falling from said drum between said arch walls and above said dividing wall, each of said arch walls providing between it and an opposite wall portion in the shaft a passage for escape of cooling air from the cooling zone sections and by-passing cooling air around said pocket, the spacing between the lower margins of the arch walls and the upper margin of the dividing wall forming opposite passages adapted to pass material from the pocket to the opposite cooling sections, said pocket and said passages being adapted to place the material in heat-exchange relation to the combustible fuel issuing from said outlets.

References Cited in the file of this patent

UNITED STATES PATENTS

| 1,116,044 | Ellis | Nov. 3, 1914 |
| 2,409,527 | Azbe | Oct. 15, 1946 |
| 2,653,809 | Azbe | Sept. 29, 1953 |
| 2,858,123 | Niems | Oct. 28, 1958 |